| (12) | United States Patent<br>McQuillen et al. | (10) Patent No.: US 10,755,580 B2<br>(45) Date of Patent: Aug. 25, 2020 |
|---|---|---|

(54) METHODS AND APPARATUS TO ENABLE VEHICLE-TO-VEHICLE GUIDANCE AND TRACKING

(71) Applicant: Ford Motor Company, Dearborn, MI (US)

(72) Inventors: Michael McQuillen, Warren, MI (US); Gopichandra Surnilla, West Bloomfield, MI (US); Daniel A. Makled, Dearborn, MI (US); Hao Zhang, Ann Arbor, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 16/461,012

(22) PCT Filed: Nov. 18, 2016

(86) PCT No.: PCT/US2016/062893
§ 371 (c)(1),
(2) Date: May 15, 2019

(87) PCT Pub. No.: WO2018/093381
PCT Pub. Date: May 24, 2018

(65) Prior Publication Data
US 2019/0272760 A1 Sep. 5, 2019

(51) Int. Cl.
*H04B 1/713* (2011.01)
*G08G 1/00* (2006.01)
(Continued)

(52) U.S. Cl.
CPC ............ *G08G 1/22* (2013.01); *G05D 1/0293* (2013.01); *G08G 1/0968* (2013.01); *G08G 1/163* (2013.01);
(Continued)

(58) Field of Classification Search
CPC . H04W 84/18; H04W 40/026; H04W 40/125; H04W 40/38; H04W 4/48; H04W 4/70; H04W 84/005; H04W 4/46
See application file for complete search history.

(56) References Cited

U.S. PATENT DOCUMENTS

| 6,356,820 B1 | 3/2002 | Hashimoto et al. |
| 7,302,321 B2 | 11/2007 | Suzuki et al. |
| (Continued) | | |

FOREIGN PATENT DOCUMENTS

CN 105067003 11/2015

OTHER PUBLICATIONS

International Searching Authority, "International Search Report and Written Opinion" issued in connection with International Application No. PCT/US2016/062893 dated Feb. 2, 2017, 11 pages.

*Primary Examiner* — Tu X Nguyen
(74) *Attorney, Agent, or Firm* — Brandon Hicks; Hanley, Flight & Zimmerman, LLC

(57) ABSTRACT

Methods and apparatus to enable vehicle-to-vehicle guidance and tracking are disclosed. An example method includes transmitting, from a first vehicle, a first message to a second vehicle. The first message requests the second vehicle to become a leader vehicle. The example method further includes receiving a second message from the second vehicle. The second message includes leader information indicative of a travel path of the second vehicle. The example method also includes receiving authorization from the second vehicle for the first vehicle to follow the second vehicle.

20 Claims, 9 Drawing Sheets

(51) Int. Cl.
*H04W 4/46* (2018.01)
*G05D 1/02* (2020.01)
*G08G 1/0968* (2006.01)
*H04W 4/08* (2009.01)
*G08G 1/16* (2006.01)

(52) U.S. Cl.
CPC ............... *G08G 1/20* (2013.01); *H04W 4/08* (2013.01); *H04W 4/46* (2018.02); *G05D 2201/0213* (2013.01)

(56) References Cited

U.S. PATENT DOCUMENTS

| | | |
|---|---|---|
| 8,643,505 B2 | 2/2014 | Tsuda et al. |
| 8,676,466 B2 | 3/2014 | Mudalige |
| 9,189,961 B2 | 11/2015 | Mehr et al. |
| 2010/0256852 A1* | 10/2010 | Mudalige .............. G08G 1/163 701/24 |
| 2015/0243165 A1 | 8/2015 | Elsheemy |

* cited by examiner

METHODS AND APPARATUS TO ENABLE VEHICLE-TO-VEHICLE GUIDANCE AND TRACKING

FIELD OF THE DISCLOSURE

This disclosure relates generally to vehicle-to-vehicle communications and, more particularly, to methods and apparatus to enable vehicle-to-vehicle guidance and tracking.

BACKGROUND

In recent years, vehicles have been manufactured with the ability to wirelessly communicate with other surrounding vehicles and/or fixed location devices using Dedicated Short-Range Communications (DSRC). The United States has mandated that all new vehicles include DSRC capabilities by 2019. Standards for DSRC have been established to define the protocols and message formats to ensure interoperability between different systems and different manufacturers. One type of DSRC message for which standards have been established is Basic Safety Message (BSM), which provides vehicle safety related information to other vehicles.

SUMMARY

Methods and apparatus to enable vehicle-to-vehicle guidance and tracking are disclosed. An example vehicle-to-vehicle guidance system in a first vehicle includes a communication interface, executed via a processor, to: transmit a first message to a second vehicle, the first message requesting the second vehicle to become a leader vehicle for the first vehicle to follow; receive a second message from the second vehicle, the second message including leader information indicative of a travel path of the second vehicle; and receive authorization from the second vehicle for the first vehicle to follow the second vehicle. The example vehicle-to-vehicle guidance system further includes a user interface, executed via the processor, to provide guidance information to a driver of the first vehicle based on the leader information.

An example method includes transmitting, from a first vehicle, a first message to a second vehicle. The first message requests the second vehicle to become a leader vehicle. The example method further includes receiving a second message from the second vehicle. The second message includes leader information indicative of a travel path of the second vehicle. The example method also includes receiving authorization from the second vehicle for the first vehicle to follow the second vehicle.

An example tangible computer readable storage medium including instructions that, when executed, cause a first vehicle to at least transmit a first message to a second vehicle. The first message requests the second vehicle to become a leader vehicle for the first vehicle to follow. The instructions further cause the first vehicle to receive a second message from the second vehicle. The second message including leader information indicative of a travel path of the second vehicle. The instructions further cause the first vehicle to receive authorization from the second vehicle for the first vehicle to follow the second vehicle.

DETAILED DESCRIPTION

Figure 1:
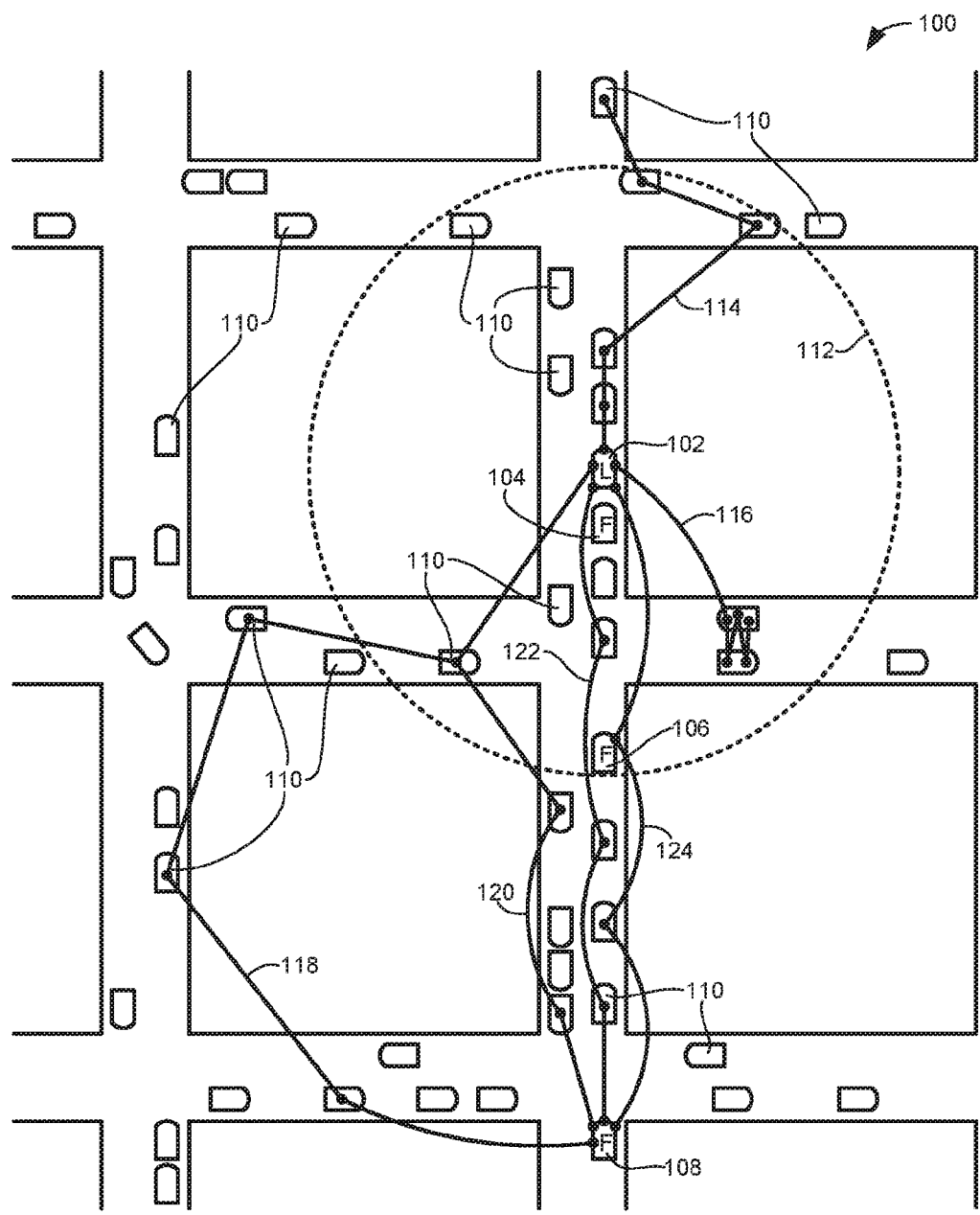
FIG. 1 illustrates an example system of roads along which a leader vehicle is leading several follower vehicles in accordance with the teachings disclosed herein.

There are often circumstances when multiple people drive together but in separate vehicles (e.g., large families or other groups on a trip, funeral processions, commercial fleet vehicles travelling to a job site, and/or other convoys of vehicles). When drivers of multiple vehicles are travelling together, one driver may be designated as the leader of the group with all other drivers following in their separate vehicles. Problems may arise if the leader in a caravan of vehicles outpaces or otherwise becomes separated from following vehicles. This may occur for any number of reasons. For example, the lead vehicle may pass through a traffic-light-controlled intersection before the light turns red while a follower vehicle is stopped by the light. As another example, vehicles not associated with the travelling party may cut in between the leader vehicle and the follower vehicle potentially causing confusion and/or preventing the follower vehicle from following the leader.

Current methods used by travelling groups include the use of global position systems (GPS). In some examples, each vehicle in the group may be guided by a separate GPS navigation system. However, this is not always a viable option as not all vehicles may have access to a GPS navigation system and/or the driver of a follower vehicle may not know the address of the destination to enter into a navigation system. Furthermore, the different GPS navigation systems in the different vehicles may select different routes and/or routes that are undesirable to the group of travelers.

Examples disclosed herein make use of vehicle-to-vehicle (v2v) communication technologies to assist vehicles in a travelling group to follow a leader vehicle in the group. More particularly, in some examples, the v2v information provided over the basic safety message (BSM) channel of dedicated short-range communications (DSRC) is used to track a leader vehicle and provide guidance information to follower vehicles. High priority BSM communications (e.g., BSM1 and BSM2) that include safety critical information (e.g., a vehicle's location, speed, travel direction, braking system status, etc.) are broadcast over DSRC to surrounding vehicles multiple times every second. Other types of lower priority BSM communications (e.g., BSM3) may be broadcast less frequently with any additional information designated by the original equipment manufacturers (OEMs) of the v2v systems. BSM standards provide that such communications are to have a range of approximately 300 meters. However, DSRC has a maximum range of approximately 1000 meters such that additional non-BSM qualifying communications with similar information may also be transmitted between vehicles at distances beyond the 300 meter threshold for BSM communications.

Data provided from one vehicle to another nearby vehicle (e.g., via a BSM communication) is referred to herein as v2v information. While v2v information is repeatedly broadcast by a vehicle to other nearby vehicles within the range of the communication broadcast, the drivers of the nearby vehicles typically do not have access to the v2v information being reported. Examples disclosed herein enable a driver of a first vehicle to request access to the v2v information reported from a second vehicle to specifically track the movement of the second vehicle. If permission to track the second vehicle is granted, the first vehicle may analyze the v2v information to generate guidance information that is provided to the driver of the first vehicle. The guidance information enables the driver of the first vehicle to follow the second vehicle even when the vehicles become spaced apart or the driver of the first vehicle is unable to see the second vehicle. In some examples, the leader vehicle may analyzer v2v information transmitted from the follower vehicle to monitor where the follower vehicle is located relative to the leader vehicle.

While BSM communications are supported up to approximately 300 meters, there may be circumstances where a follower vehicle becomes separated from a leader vehicle by more than that distance. In some such examples, non-BSM communications (e.g., with ranges of up to 1000 meters) may be employed. Additionally or alternatively, the v2v information to be transmitted between a leader vehicle and a follower vehicle in such situations may be relayed or cascaded through other nearby vehicles to bridge the gap between the vehicles. In such examples, there is no need for the intermediate vehicles to have the same permission to access the v2v information as the follower vehicle or to otherwise be associated with the vehicle convoy because the intermediate vehicles are merely relaying the information using BSM communications that are standardized for all vehicles. Further still, in some examples, the messages cascaded across multiple vehicles may be encrypted to protect the identity of individuals during the transmissions.

Additionally or alternatively, messages between a leader vehicle and a follower vehicle spaced farther apart than the threshold of 300 meters may be communicated through other intermediate relay nodes such as fixed-position roadside devices capable of communicating using DSRC. Additionally or alternatively, alternate communication technologies may be used to enable the leader and follower vehicles to communicate over larger distances. For example, the messages may be sent via an Internet based system (e.g., via a long-term evolution (LTE) network used by mobile phones) or via available Wi-Fi networks.

Before a follower vehicle can track a leader vehicle, the follower vehicle needs to be able to identify the v2v information from the leader vehicle relative to v2v information being transmitted from other nearby vehicles and obtain permission to use such information for guidance. Accordingly, in some examples, the follower vehicle and leader vehicle undergo a handshake algorithm. In some examples, a driver of the follower vehicle may input a command, via a user interface associated with the vehicle, for the vehicle to enter or initiate a following mode. Once the following mode is selected, the follower vehicle may poll or discover all nearby vehicles by logging v2v information received from each nearby vehicle. As used herein, two vehicles are considered to be "nearby" if v2v information broadcast by either vehicle can be directly communicated directly via a BSM communication (e.g., within approximately 300 meters). Having identified the nearby vehicles, the follower vehicle may provide a list of the nearby vehicles as potential leader vehicles for a driver or occupant of the follower vehicle to select. In some examples, the potential leader list may be a subset of all nearby vehicles based on the information collected from the nearby vehicles. For instance, in some examples, the potential leader list may include only those vehicles that can be matched to people listed in a personal database (e.g., a phone contact list, a social media connections list, etc.) of the occupant of the follower vehicle. Matching surrounding or nearby vehicles to individuals an occupant of the follower vehicle knows enables the occupant to more easily identify the desired vehicle to be selected as a leader vehicle.

Once an occupant selects the desired nearby vehicle, the follower vehicle transmits a message to the selected vehicle requesting the vehicle to become a leader vehicle that the follower vehicle is to track and follow. The leader vehicle may transmit a second message responding to the request that either grants or denies authorization to the follower vehicle to track the leader vehicle. The authorization may be based on an input by the driver and/or another occupant in the leader vehicle. If authorization is granted, the follower vehicle begins analyzing the v2v information subsequently received from the leader vehicle to generate guidance information provided to the driver in the follower vehicle. In some examples, the v2v information provided by the leader information is the same v2v information broadcast to all surrounding vehicles regardless of whether the vehicle is in a leader/follower relationship. In other examples, the v2v information transmitted from the leader vehicle may include additional information that is included only after the leader vehicle has accepted the request to become a leader vehicle. In some examples, additional information in the initial handshake messages and/or additional messages may be sent between the follower vehicle and the leader vehicle to enable encryption of the data sent therebetween.

FIG. 1 illustrates an example system of roads 100 along which a leader vehicle 102 (demarcated by the letter "L" in FIG. 1) is leading several follower vehicles 104, 106, 108 (demarcated by the letter "F") in accordance with the teachings disclosed herein. A number of other vehicles 110 are also travelling along the example road system 100. In the illustrated example, each of the leader vehicle 102 and the follower vehicles 104, 106, 108 includes a v2v guidance system 300 (FIG. 3) that enables the vehicles 102, 104, 106, 108 to communicate using DSRC.

Messages transmitted using DSRC, such as BSM communications, are broadcast to all vehicles equipped to receive such communications within range of the transmission as well as to any other device equipped to receive such communications that are within range. In some examples, the range of BSM communications is approximately 300 meters. In the illustrated example of FIG. 1, the dashed circle 112 represents the transmission range of communications from the leader vehicle 102. Thus, in the illustrated example, there are fifteen vehicles within the communication range of the leader vehicle 102. The number of vehicles within the circle 112 and which vehicles are in the circle 112 changes with time as the leader vehicle 102 and the surrounding vehicles move around. Thus, when the leader vehicle broadcasts a message containing v2v information, the information will be transmitted to every vehicle within the circle 112 at the time of the transmission.

Not all of the other vehicles 110 may be equipped with DSRC capabilities (e.g., older vehicles) such that they will not be able to receive transmissions from the leader vehicle 102 (or any other vehicle) regardless of how close they are together. However, in the illustrated example, at least some of the other vehicles 110 include the capability to both receive and transmit messages (e.g., v2v information) using DSRC. Furthermore, with the mandate in the United States for all new vehicles to include DSRC capabilities, it is likely that more and more vehicles will include v2v communication capabilities as time goes on. Thus, while communications originating from the leader vehicle 102 are shown and described, many of the other vehicles 110 (and the follower vehicles 104, 106, 108) are also broadcasting v2v information such that any particular vehicle may be receiving messages from multiple other vehicles at any given point in time.

In some examples, the leader vehicle 102 becomes a leader in response to a request from each of the follower vehicles 104, 106, 108. For example, an occupant (e.g., a driver or a passenger) in the first follower vehicle 104 may activate a follower mode in the vehicle 104. In some examples, when placed in the follower mode, the follower vehicle 104 identifies or discovers all nearby vehicles as potential vehicles to become a leader vehicle that the follower vehicle 104 is to track and follow. The nearby vehicles may be discovered by collecting v2v information transmitted from each vehicle within communication range of the follower vehicle 104.

In some examples, a generic vehicle identifier is assigned to each discovered vehicle and presented to the occupant of the follower vehicle for selection. Once the occupant has selected the desired vehicle to follow, the follower vehicle 104 may transmit a message requesting the selected vehicle to become a leader vehicle (e.g., the leader vehicle 102) and authorize or allow the follower vehicle 104 to track and follow the vehicle. Messages transmitted using DSRC are broadcast to all vehicles in the immediate area. Accordingly, in some examples, the message designates the selected vehicle as the intended recipient of the message so that any other vehicle that is within range of the broadcast will ignore the message.

There may be a significant number of vehicles within the communication range of the follower vehicle 104 (e.g., 300 meters) such that providing a list of generic vehicle identifiers will be insufficient to enable an occupant to select the vehicle the occupant desires to follow. Accordingly, in some examples, the full list of vehicles that may be potential leaders is limited based on the location of the vehicle relative to the follower vehicle 104. For example, while the follower vehicle 104 may be able to detect all vehicles within a 300 meter radius, the follower vehicle 104 may reduce what vehicles are presented to the occupant to those vehicles that are within a threshold distance of the follower vehicle 104 (e.g., 10 meters, 15 meters, etc.). The smaller threshold distance may be based on the assumption that a group of vehicles embarking on a trip with a designated leader vehicle will begin close together. In some examples, the list of potential leader vehicles may be based on the position of the identified vehicles relative to the follower vehicle 104 (e.g., list only the vehicles that are in front of the follower vehicle, list the vehicles in the order of their relative position to each other, etc.) to further assist the occupant in identifying the correct vehicle intended as the leader.

In some examples, the follower vehicle 104 may limit the vehicles included in the potential leader list to those that can be matched to a particular individual known to the occupant of the follower vehicle 104. For example, the follower vehicle 104 may broadcast a message polling nearby vehicles for occupant identifying data. Occupant identifying data is any type of data that is accessible by a vehicle and that may be used to uniquely identify an occupant of the vehicle. For example, individuals may connect their mobile phones to their vehicles while they are driving. Thus, the vehicles may have access to the phone numbers of the individuals that can be used to uniquely identify the individuals. In response to the request from the follower vehicle 104, any vehicle that is connected to a mobile phone may report the associated phone number. Once such information is collected, the follower vehicle 104 compares the phone information to a phone contact list of the occupant of the follower vehicle 104. If the collected phone information matches a person in the occupant's contact list, the matching person is associated with the vehicle from which the phone information was received and presented to the occupant for selection as a potential leader.

As another example, the occupant identifying data may correspond to an individual's profile on social media. Just as individuals may connect their phones to their vehicles, their vehicles may also be connected to the Internet and one or more different social media accounts. Furthermore, some social media accounts enable users to share their location with their connections. Accordingly, in some examples, the follower vehicle 104 may poll nearby vehicles requesting a response if the vehicle is connected to a social media account. Such occupant identifying data may then be compared to the connections in the social media account of the occupant of the follower vehicle 104 seeking to identify the leader vehicle 102 to initiate their relationship as a leader vehicle and a follower vehicle.

In some examples, occupant identifying data (e.g., phone information, social media information, etc.) is encrypted to maintain the privacy of the individuals. While the follower vehicle 104 may directly collect and compare the occupant identifying data to a corresponding personal database (e.g., phone contact list, social media connections, etc.) of the occupant, in other examples, the occupant identifying data is transmitted to a remote facility for analysis and identification. In such examples, the follower vehicle 104 may only directly receive the occupant identifying data and/or the corresponding identified individuals that actually match people in the occupant's personal database.

Once a complete list of potential leader vehicles (and/or individuals associated with such vehicles identified based on occupant identifying data) is generated and provided to an occupant of the follower vehicle 104 for selection, a message is transmitted to the selected vehicle (e.g., the leader vehicle 102) to request the selected vehicle to become a leader vehicle that the follower vehicle 104 is given permission to track and follow. In some examples, the leader vehicle 102 provides the request to an occupant to accept or deny the request (e.g., via a human machine interface of the vehicle 102). In some examples, the request is provided to the occupant of the leader vehicle 102 based on the occupant identifying data used to identify the occupant. For example, if the occupant was identified as matching a person in a phone contact list of the driver of the follower vehicle 104, the request to become a follower may be provided to the occupant of the leader vehicle 102 via the phone of the occupant, which is connected to (e.g., via Bluetooth) the leader vehicle 102. Similarly, if the occupant is identified based on social media contacts, the request for the leader vehicle 102 to authorize the follower vehicle 104 to track and follow the leader vehicle 102 may be provided via the corresponding social media application.

If permission or authorization is granted to the follower vehicle 104 to track and follow the leader vehicle 102, the follower vehicle 104 may begin analyzing the v2v information received from the leader vehicle 102 to generate guidance information to be provided to a driver of the follower vehicle 104. As described above, DSRC equipped vehicles may already be communicating v2v information about their location, direction, and/or any other relevant information to each other without tracking or following each other. Thus, the permission or authorization requested by the follower vehicle 104 is to authorize the follower vehicle 104 to present the v2v information from the leader vehicle 102 as guidance information to a driver of the follower vehicle 104 to assist the driver in following the leader vehicle 102.

The guidance information may be provided to the following driver via any suitable human machine interface. For example, the travel path of the vehicle may be audibly described using navigation voice cues (e.g., "Turn right in 0.5 miles"). Such voice cues may be provided from a navigation system built into the follower vehicle 104 or via a portable device (e.g., smartphone, portable navigation system, etc.) connected to the follower vehicle 104. As another example, navigation directions may be provided on a user interface screen of the vehicle 104 and/or a portable device connected to the vehicle 104. In some examples, the travel path and/or location of the leader vehicle 102 (and/or any other relevant guidance information) may be overlaid on a map. Additionally or alternatively, the guidance information may be provided via a heads-up display installed in the follower vehicle 104.

In the illustrated example of FIG. 1, the leader vehicle 102 has already gone through a handshake algorithm with each of the follower vehicles 104, 106, 108 to authorize the follower vehicles 104, 106, 108 to track and follow the leader vehicle 102. That is, in FIG. 1, the leader vehicle 102 has already authorized the follower vehicles 104, 106, 108 to generate and provide guidance information to drivers of the follower vehicles based on v2v information broadcast during BSM communications. Thus, each time the leader vehicle 102 broadcasts the v2v information, the follower vehicles 104, 106 that are within the broadcast range of the transmission (i.e., within the circle 112) will process the v2v information and provide relevant guidance information to the drivers. While the same v2v information may be transmitted to and received by the other vehicles 110 within the circle 112 of FIG. 1, these vehicles will not generate guidance information or provide such information to their respective drivers because the other vehicles 110 have not been granted permission as followers of the leader vehicle 102.

Unlike the first and second follower vehicles 104, 106 that are within the circle 112 representative of the signal range of the BSM communications from the leader vehicle 102, the third follower vehicle 108 has become separated from the leader vehicle 102 and fallen outside the signal range. In such situations, broadcasts of v2v information from the leader vehicle 102 may not reach the follower vehicle 108, thereby inhibiting the follower vehicle 108 from tracking and following the leader vehicle 102. Accordingly, in some examples, the leader vehicle 102 indirectly communicates with the follower vehicle 108 by relaying or cascading the v2v information through intermediate relay nodes. In the illustrated example, the intermediate relay nodes correspond to the follower vehicles 104, 106 and/or the other vehicles 110 unassociated with the traveling group of vehicles 102, 104, 106, 108. In some examples, the intermediate relay nodes may be fixed position devices along the roadways on which the vehicle 102, 104, 106, 108 are travelling.

In some examples, the leader vehicle 102 enables broadcast v2v information to be cascaded through one or more intermediate relay nodes to bridge the gap between the leader vehicle 102 and the follower vehicle 108 by including rebroadcast instructions with the v2v information. The rebroadcast instructions provide directions for the intermediate relay nodes to retransmit or rebroadcast the v2v information from the leader vehicle 102 to other relay nodes within communication range of the rebroadcasting node but outside the range for direct communication with the leader vehicle 102. By creating a chain of retransmissions for particular v2v information that extends across multiple different nodes, relatively large distances may be covered to enable the follower vehicle 108 that has become separated from the leader vehicle 102 to remain in communication.

The v2v information broadcast from the leader vehicle 102 in a first leg of a cascaded message, subsequently rebroadcast by each vehicle within range of the leader vehicle 102 in a second leg of the cascaded message, and then rebroadcast by every additional vehicle that received the second leg of the message and so on through additional legs of the cascaded message can result in a large number of transmissions being relayed between different vehicles. Many of these transmissions may not result in a communication path that reaches the follower vehicle 108. Accordingly, in some examples, the rebroadcast instructions provided with the v2v information include qualifications and/or limits defining when vehicles are to rebroadcast the relayed message or to stop relaying the message.

For purposes of explanation, six different communication chains or rebroadcast paths 114, 116, 118, 120, 122, 124 are represented in FIG. 1 that begin at the leader vehicle 102 and branch out to other nearby vehicles in different chains. Thus, the first leg in each rebroadcast path 114, 116, 118, 120, 122, 124 corresponds to the same initial message broadcast from the leader vehicle 102. Each subsequent leg in each path is a separate rebroadcast of the initial message except for the second leg of the third and fourth rebroadcast paths 118, 120 that are associated with the same transmission because they stem from the same vehicle. While six rebroadcast paths 114, 116, 118, 120, 122, 124 are represented, there may be many additional rebroadcast paths that are not shown that may or may not reach the follower vehicle 108 and that may involve one or more of the same vehicles as intermediate relay nodes in different ones of the paths.

In the illustrated example, the first two rebroadcast paths 114, 116 do not reach the follower vehicle 108, whereas the remaining four rebroadcast paths 118, 120, 122, 124 do reach the follower vehicle 108. Of the third, fourth, fifth, and sixth rebroadcast paths 118, 120, 122, 124 that were completed, the sixth is the most efficient because it includes only three legs based on two intermediate vehicles (one being the second follower vehicle 106) between the leader vehicle 102 and the third follower vehicle 108. By contrast, the fourth and fifth rebroadcast paths 120, 122 include four legs each, and the third rebroadcast path 118 includes five legs. In the illustrated example, none of the rebroadcast paths 114, 116, 118, 120, 122, 124 includes more than five legs because of limits placed on the retransmission of the v2v information originating from the leader vehicle 102 as described more fully below in connection with FIG. 2.

While each of the six example rebroadcast paths 114, 116, 118, 120, 122, 124 shown in FIG. 1 pass through different vehicles, in some examples, different rebroadcast paths between the leader vehicle 102 and the follower vehicle 106 may be cascaded through intermediate relay nodes other than the vehicles. For instance, rather than direct vehicle-to-vehicle (v2v) communications, one or more of the legs in different ones of the rebroadcast paths may involve vehicle-to-infrastructure and/or infrastructure-to-vehicle communications, vehicle-to-pedestrian and/or pedestrian-to-vehicle communications, vehicle-to-device and/or device-to-vehicle communications, vehicle-to-grid and/or grid-to-vehicle communications, any other suitable communication technology, and/or any combination of the above.

Figure 2:
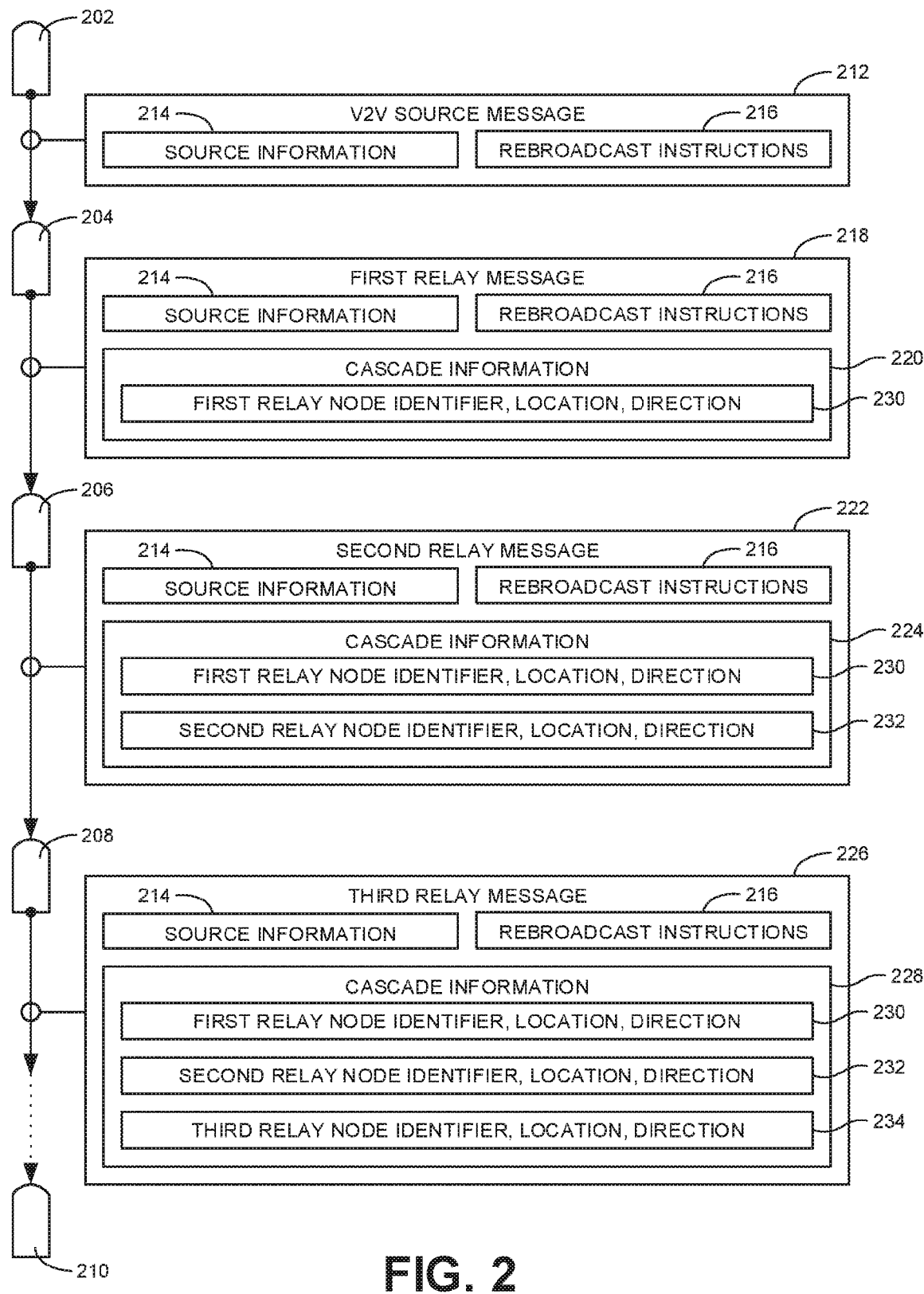
FIG. 2 illustrates an example cascade of messages that has multiple transmission legs passing through intermediate vehicles between a source vehicle and an intended recipient vehicle.

FIG. 2 illustrates an example cascade of messages from a source vehicle 202 that has multiple legs or links passing through intermediate vehicles 204, 206, 208 before reaching an intended recipient vehicle 210. The source vehicle 200 corresponds to the vehicle from which cascaded message initially originates and the intended recipient vehicle 210 corresponds to the vehicle to which the message is directed. Thus, if the message corresponds to v2v information broadcast by the leader vehicle 102 to the follower vehicle 108 of FIG. 1, the source vehicle 202 is the leader vehicle 102 and the intended recipient vehicle 210 is the follower vehicle 108. In some examples, a message may be cascaded from the follower vehicle 108 to the leader vehicle 102. In such examples, the follower vehicle 108 of FIG. 1 corresponds to the source vehicle 200 and the intended recipient vehicle 210 is the leader vehicle 102.

In the illustrated example, a first message (e.g., a v2v source message 212) is broadcast by the source vehicle 202 as a leader vehicle to intermediate relay nodes (e.g., the intermediate vehicles 204, 206, 208) within communication range of the source vehicle 202. As shown in the illustrated example, the v2v source message 212 message includes source information 214 and rebroadcast instructions 216.

The source information 214 may correspond to leader information if the source vehicle 202 is a leader vehicle (e.g., the leader vehicle 102) and to follower information if the source vehicle 202 is a follower vehicle (e.g., the follower vehicle 108). In some examples, the source information 214 corresponds to the v2v information broadcast by the source vehicle 200 as part of a standard BSM communication even when the source vehicle 200 is not part of a travelling group of vehicles. In some examples, the source information includes a source vehicle identifier to identify the source vehicle 200, a location of the source vehicle 200 (e.g., based on GPS coordinates), a speed of the source vehicle 200, a direction of travel of the source vehicle 200, an anticipated travel route of the source vehicle 200, a final destination of the source vehicle 200, a turn signal status of the source vehicle 200, a steering wheel position of the source vehicle 200, a timestamp identifying when the message 212 was transmitted, and/or any other relevant information. In some examples, the anticipated travel route and/or the final destination may be provided by a navigation system in the source vehicle 200 providing navigation assistance to the driver of the source vehicle 200.

The rebroadcast instructions 216 in the message 212 provide information to direct intermediate relay nodes (e.g., the vehicles 204, 206, 208) to relay the source information 214 to the intended recipient vehicle 210. In some examples, the rebroadcast instructions include intended recipient information to identify the intended recipient vehicle 210 and/or to indicate the last known location of the intended recipient vehicle 210. Further, in some examples, the rebroadcast instructions 216 include a limit corresponding to a threshold number of legs or links in a communication path after which no further rebroadcasts will be relayed. For example, in the illustrated example of FIG. 1, the threshold number of transmission legs is set to five. Thus, the first and second rebroadcast paths 114, 116 stop without reaching the follower vehicle 108 because the number of transmissions along the communication path (e.g., the number of legs) has reached the threshold limit. The threshold number of communication links may be any suitable number (e.g., 2, 3, 5, 10, etc.). Additionally or alternatively, in some examples, the rebroadcast instructions include a temporal limit defining a timeout period after which no subsequent rebroadcasts are to be transmitted. The timeout period may be any suitable period of time after the initial transmission of the v2v source message 212 (e.g., 5 seconds, 10 seconds, 30 seconds, etc.).

In addition to limits on the rebroadcasts, in some examples, the rebroadcast instructions 216 may include one or more qualifications that the intermediate relay nodes must satisfy before the node will rebroadcast a message. Such qualifications may apply regardless of whether limits on the rebroadcasts have been reached. In some examples, the qualifications may be based on a location of the relay node relative to a location of the source vehicle 200 (identified in the source information 214) and the last known location of the intended recipient vehicle 210 (identified in the rebroadcast instructions 216). For example, if an intermediate relay node is farther away from the intended recipient vehicle 210 than the source vehicle 202, it is unlikely that the intermediate relay node will be able to assist in bridging the gap between the source vehicle 202 and the intended recipient vehicle 210. Accordingly, in some examples, the intermediate relay node may be disqualified from rebroadcasting a message. Thus, with reference to FIG. 1, the first rebroadcast path 114 would be stopped after the first leg because the vehicle that received the first transmission does not meet the qualification of being closer to the follower vehicle 108 than the leader vehicle 102.

In some examples, the qualifications for the intermediate relay nodes may be based on a list of designated relay nodes included within the rebroadcast instructions. That is, an intermediate relay node is qualified to rebroadcast a message if the message specifically designates the node to rebroadcast the message. Nodes that are not specifically designated may be excluded or disqualified from rebroadcasting the message. In some examples, the list of designated relay nodes is generated based on previous cascaded messages sent between the source vehicle 202 and the intended recipient vehicle 210. For example, FIG. 1 shows that four rebroadcast paths 118, 120, 122, 124 reached the follower vehicle 108. Based on these completed rebroadcast paths 118, 120, 122, 124, the follower vehicle 108 may specifically assign the vehicles used in the different rebroadcast paths 118, 120, 122, 124 as designated nodes for a return path of a second message sent from the follower vehicle 108 back to the leader vehicle 102 to the exclusion of all other vehicles. That is, any vehicle that was not used as an intermediate relay node for one of the completed rebroadcast path 118, 120, 122, 124 may be disqualified from use for a return message because they are not designated in the rebroadcast instructions included in the message to be cascaded.

In some examples, only a subset of the vehicles associated with the completed rebroadcast paths 118, 120, 122, 124 are designated as qualified for subsequent message cascading. In some examples, which vehicles are designated for return path messaging is based on which rebroadcast paths 118, 120, 122, 124 are the most efficient. For example, in FIG. 1, the third rebroadcast path 118 has more legs than the other three completed paths 120, 122, 124 and, therefore, the vehicles associated specifically with the third path 118 may be excluded or disqualified from being used for future communications. In some examples, the subset of vehicles used for future communicates may depend upon the direction of travel and/or location of the vehicles. For example, while each of the fourth and fifth rebroadcast paths 120, 122 includes four links in the communication chain, none of the vehicles associated with the fourth path 120 are moving in the same direction as the leader vehicle 102 and the follower vehicle 108. By contrast, all of the vehicles in the fifth path 122 are moving in the same direction. Accordingly, in some examples, the vehicles in the fourth rebroadcast path 120 may be excluded from future communications as it is unlikely they will continue being in a position to bridge the gap between the leader vehicle 102 and the follower vehicle 108. In some examples, all follower vehicles following the same leader vehicle may be specifically designated as potential intermediate relay nodes for cascading messages.

In some examples, the identification of the intermediate relay nodes and/or the determination of their location and direction is based on cascade information provided by each intermediate relay node as it rebroadcasts a message. For example, as represented in the illustrated example of FIG. 2, the second vehicle 204 (or other intermediate relay node) may broadcast a first relay message 218 after receiving the v2v source message 212. As shown in the illustrated example, the first relay message 218 includes the source information 214 and the rebroadcast information 216 of the v2v source message 212. Thus, the first relay message 218 is a rebroadcast of the original v2v source message 212. However, the first relay message 218 also includes additional cascade information 220 with information corresponding to the second vehicle 204 in the cascaded message chain. The third vehicle 206 may broadcast a second relay message 222 after receiving the first relay message 218 from the second vehicle 204. The second relay message 222 again includes the source information 214 and the rebroadcast instructions 216 from the original v2v source message 212 along with updated cascade information 224. In the illustrated example, the communication chain continues to the fourth vehicle 208 that may broadcast a third relay message 226 that again includes the source information 214 and the rebroadcast instructions 216 along with further updated cascade information 228.

In some examples, the first, second, and third relay messages 218, 222, 226 are transmitted along with standard BSM communications that include standard v2v information corresponding to the vehicles 204, 206, 208 transmitting the relay messages 218, 22, 229. In some examples, the v2v information included in such BSM communications is the basis for the content added to the cascade information 220, 224, 228 in each successive relay message 218, 222, 226. More particularly, in some examples, the cascade information 220, 224, 228 includes relay node information corresponding to each intermediate relay node (e.g., the vehicles 204, 206, 208) by which the message is rebroadcast. The relay node information may include a relay node identifier to identify each node (e.g., vehicle) in the communication chain or rebroadcast path. Further, in some examples, the relay node information may include a location and/or a direction of travel of each node in the rebroadcast path.

In the illustrated example of FIG. 2, the cascade information 220 in the first relay message 218 includes first relay node information 230 corresponding to the second vehicle 204. The cascade information 224 in the second relay message 222 includes the first relay node information 230 included in the previous relay message 218 plus second relay node information 232 corresponding to the third vehicle 206. Further, the cascade information 228 in the third relay message 226 includes the first relay node information 230 and the second relay node information 232 provided in the previous relay message 222 plus third relay node information 234 corresponding to the fourth vehicle 208. In some examples, as shown in FIG. 2, the relay node information 230, 232, 234 is arranged in order within the corresponding cascade information 220, 224, 228 to indicate the order of the rebroadcasts from each node. Additionally or alternatively, each relay node information 230, 232, 234 may include a timestamp to determine their ordering. In the illustrated example, the cascade information 220, 224, 228 does not include information specifically relating to the source vehicle 200 because such information is already provided in the source information 214

In some examples, the number of separate relay node information items included in the cascade information is used by each intermediate relay node (e.g., the vehicles 204, 206, 208) to determine whether a specified limit has been reached. For example, the three relay node information items 230, 232, 234 in the third relay message 226 indicate that there have been four transmissions (including the initial transmission from the source vehicle 202). Thus, if the rebroadcast instructions 216 provide a threshold limit of five transmissions, any vehicle that receives the third relay message 226 will not rebroadcast the message because the threshold limit will have been met. Additionally, the number of separate relay node information items may be used by the intended recipient vehicle 210 to identify the efficient rebroadcast paths (e.g., those with the fewest transmission legs). Further, the location and direction information included in the relay node information may be used to determine whether the particular nodes may be relied on for future cascaded messages. Based on this analysis, the intended recipient vehicle 210 may identify certain ones of the intermediate relay nodes as designated nodes for a return path message. In such examples, the particular relay node identifiers may be included into new rebroadcast information associated with the new return path message.

In some examples, the intermediate relay nodes may be limited in the number of times they can serve as a link in a single communication chain. For example, as shown in FIG. 1, the second rebroadcast path 116 includes a message that is passed back and forth between two vehicles. In the context of FIG. 2, this can be represented as the second and fourth vehicles 204, 208 corresponding to the same vehicle. In some examples, when the vehicle receives the message for a second time, the cascade information will contain relay node information already identifying the vehicle. Thus, the vehicle may determine that the message was already rebroadcast by the vehicle such that broadcasting the message again is unlikely to serve any purpose. Accordingly, in some examples, a vehicle is limited to transmitting a particular message one time. In other examples, a vehicle may be limited to a different number of times and/or there may be no limit. Even if there is a limit on the retransmissions of a message in association with a single communication path, in some examples, the vehicle may nevertheless be used as a node in multiple different paths. For example, both the second and third vehicles 204, 206 in FIG. 2 may be within range of the source vehicle 202 such that both vehicles 204, 206 receive the v2v source message 212. Further, each of the second and third vehicles 204, 206 may rebroadcast the message to each other as separate instances of the first relay message 218. While both vehicles 204, 206 have already rebroadcast the initial message (as separate instances of the first relay message 218), in some examples, they may both rebroadcast the message again (as separate instances of the second relay message 222) because each message is associated with a different communication path.

Figure 3:
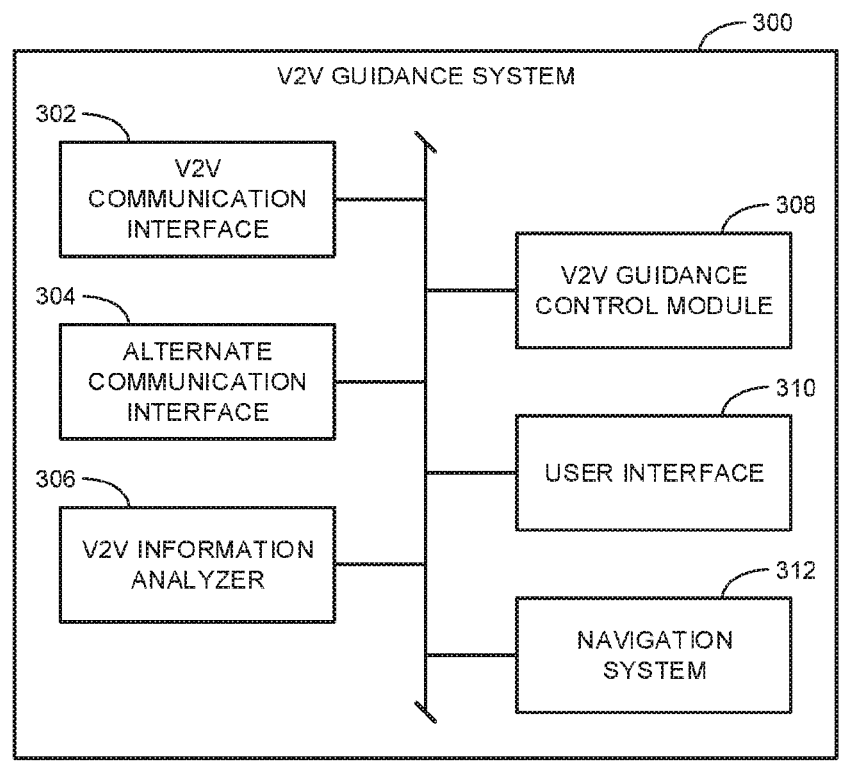
FIG. 3 is a block diagram illustrating an example vehicle-to-vehicle (v2v) guidance system that may be implemented in the leader vehicle and/or the follower vehicles of FIG. 1.

FIG. 3 is a block diagram illustrating an example v2v guidance system 300 that may be implemented in the leader vehicle 102 and the follower vehicles 104, 106, 108 of FIG. 1. The example v2v guidance system 300 includes an example v2v communication interface 302, an example alternate communication interface 304, an example v2v information analyzer 306, an example v2v guidance control module 308, an example user interface 310, and an example navigation system 312.

In the illustrated example, the v2v guidance system 300 is provided with the example v2v communication interface 302 to transmit v2v information to nearby vehicles and to receive v2v information from nearby vehicles. In some examples, v2v information may also be transmitted to, or received from, fixed-position devices other than vehicles positioned along roadways. As used herein, v2v information includes any type of information communicated between vehicles. Thus, in some examples, v2v information includes the source information 214, the rebroadcast instructions 216, and/or the cascade information 220, 224, 228 described above in connection with FIG. 2. The v2v information transmitted using the example v2v communication interface 302 involves any type of communication using DSRC (e.g., BSM communications). Additionally or alternatively, v2v information may be transmitted and received via the alternate communication interface 304. The example alternate communication interface 304 may correspond to one or more different communication interfaces including communications over a mobile phone network, a Wi-Fi network, ZigBee, Z-wave, vehicle-to-infrastructure (v2i) communications, vehicle-to-pedestrian (v2p) communications, vehicle-to-device (v2d) communications, vehicle-to-grid (v2g) communications, and/or any other communication medium.

In the illustrated example, the v2v guidance system 300 is provided with the example v2v information analyzer 306 to analyze the v2v information received via the v2v communication interface 302 (and/or the alternate communication interface 304). In some examples, the v2v information analyzer 306 identifies each nearby vehicle and/or identifies the nearby vehicles associated with particular occupant identifying data. Further, the v2v information analyzer 306 may analyze the cascade information 220, 224, 228 to determine efficient rebroadcast paths and identify which vehicles may be designated as qualifying to be intermediate relay nodes in subsequent cascaded messages.

In the illustrated example, the v2v guidance system 300 is provided with the example v2v guidance control module 308 to direct and control the interaction of the other block elements in the v2v guidance system 300. Furthermore, in some examples, the v2v guidance control module 308 generates a potential leader list of vehicles identified by the v2v information analyzer 306 that an occupant of a follower vehicle may select as a leader vehicle for the follower vehicle to follow. Further still, the v2v guidance control module may generate guidance information based on the collected v2v information from a leader vehicle that is to be provided to a driver of a follower vehicle to enable the driver to follow the leader vehicle.

In the illustrated example, the v2v guidance system 300 is provided with the example user interface 310 to enable interactions between a driver or other occupant of a vehicle and the functionality of the v2v guidance system 300. In some examples, the user interface 310 in a follower vehicle may receive inputs by an occupant of the vehicle requesting the vehicle to enter a following mode. Further, the user interface 310 may then provide a list of potential leader vehicles, as generated by the v2v guidance control module 308, for selection by the occupant to then send a request for permission to follow the selected vehicle. In some examples, the user interface 310 in the leader vehicle may provide an occupant of the leader vehicle the request initiated by the occupant of the follower vehicle. Once the leader vehicle and the follower vehicle have implemented a handshake operation to enable the follower vehicle to track and follow the leader vehicle, the user interface 310 in the follower vehicle may provide guidance information to the driver of the follower vehicle. In some examples, the follower vehicle may also authorize the leader vehicle to provide information received from the follower vehicle to a driver of the leader vehicle. In such examples, relevant information received at the leader vehicle from the follower vehicle may be provided via the example user interface 310 of the leader vehicle. The example user interface 310 may provide information to the occupants of a vehicle through any suitable means such as visually via a screen built into the vehicle, audibly via speakers in the vehicle, and/or via external devices connected to the vehicle (e.g., a smartphone of an occupant of the vehicle).

In the illustrated example, the v2v guidance system 300 is provided with the example navigation system 312 to determine an anticipated travel route for a leader vehicle based on a user-input final destination. In some examples, the navigation system 312 may provide navigation guidance to the driver of the leader vehicle. Furthermore, in situations where a follower vehicle becomes separated from a leader vehicle and they are not able to communicate, the navigation system 312 in the follower vehicle may provide navigation guidance to the driver of the follower vehicle because the driver is no longer able to track and follow the leader vehicle.

While an example manner of implementing the v2v guidance system 300 is illustrated in FIG. 3, one or more of the elements, processes and/or devices illustrated in FIG. 3 may be combined, divided, re-arranged, omitted, eliminated and/or implemented in any other way. Further, the example v2v communication interface 302, the example alternate communication interface 304, the example v2v information analyzer 306, the example v2v guidance control module 308, the example user interface 310, the example navigation system 312, and/or, more generally, the example v2v guidance system 300 of FIG. 3 may be implemented by hardware, software, firmware and/or any combination of hardware, software and/or firmware. Thus, for example, any of the example v2v communication interface 302, the example alternate communication interface 304, the example v2v information analyzer 306, the example v2v guidance control module 308, the example user interface 310, the example navigation system 312, and/or, more generally, the example v2v guidance system 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example v2v communication interface 302, the example alternate communication interface 304, the example v2v information analyzer 306, the example v2v guidance control module 308, the example user interface 310, and/or the example navigation system 312 is/are hereby expressly defined to include a tangible computer readable storage device or storage disk such as a memory, a digital versatile disk (DVD), a compact disk (CD), a Blu-ray disk, etc. storing the software and/or firmware. Further still, the example v2v guidance system 300 of FIG. 3 may include one or more elements, processes and/or devices in addition to, or instead of, those illustrated in FIG. 3, and/or may include more than one of any or all of the illustrated elements, processes and devices.

Flowcharts representative of example methods for implementing the v2v guidance system 300 of FIG. 3 are shown in FIGS. 4-8. In these example, the methods may be implemented using machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4-8, many other methods of implementing the example v2v guidance system 300 may alternatively be used. For example, the order of execution of the blocks may be changed, and/or some of the blocks described may be changed, eliminated, or combined.

As mentioned above, the example processes of FIGS. 4-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
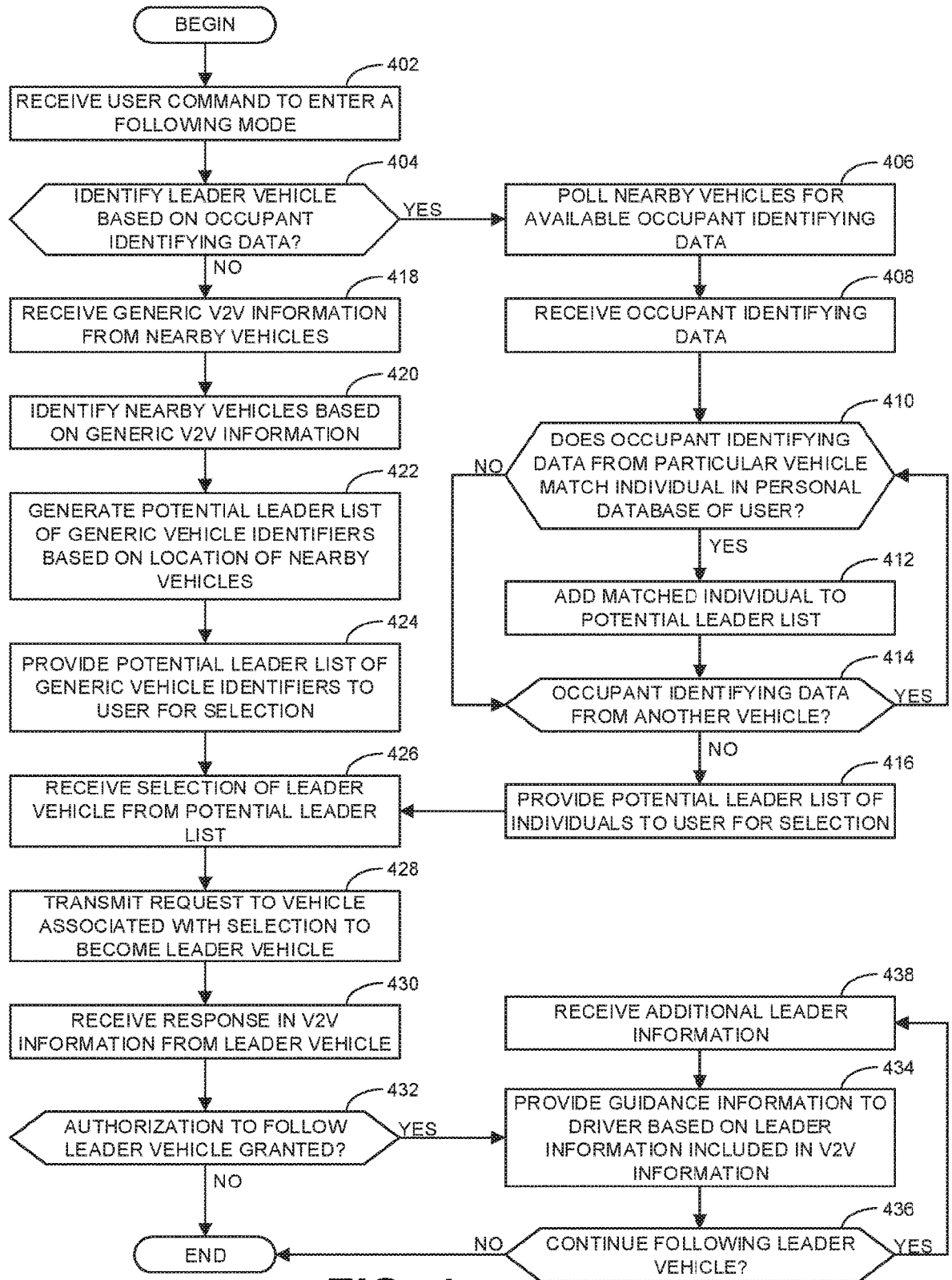
FIG. 4 is a flowchart representative of an example method to implement the example v2v guidance system of FIG. 3 in one of the follower vehicles of FIG. 1 to initiate tracking of the leader vehicle of FIG. 1.

Turning in detail to the drawings, FIG. 4 is a flowchart representative of an example method to implement the example v2v guidance system 300 in a follower vehicle (e.g., the follower vehicle 104 of FIG. 1) to initiate tracking of a leader vehicle (e.g., the leader vehicle 102 of FIG. 1). The method of FIG. 4 begins at block 402 where the example user interface 310 receives a user command to enter a following mode. Placing the follower vehicle 104 into a following mode initiates the process to identify a leader vehicle 102 the follower vehicle 104 is to track and follow. At block 404, the example v2v guidance control module 308 determines whether to identify the leader vehicle 102 based on occupant identifying data. In some example, this determination is made based on the process through which the user command at block 402 was provided by the user. For example, if the user command was provided via a smartphone of the user that is connected to the follower vehicle 104 and/or via a social media application connected to the vehicle 104, the example v2v guidance control module 308 may determine to identify the leader vehicle 102 based on occupant identifying data that matches the personal database (e.g., phone contact list, social media contact list, etc.) associated with the user. In some examples, the user command may directly specify whether to identify the leader vehicle based on occupant identifying data.

If, at block 404, the example v2v guidance control module 308 determines to identify the leader vehicle 102 based on occupant identifying data, control advances to block 406 where the example v2v communication interface 302 polls nearby vehicles for available occupant identifying data. At block 408, the example v2v communication interface receives occupant identifying data. In some examples, the occupant identifying data is encrypted to protect the privacy of the individuals associated with the data. At block 410, the example v2v guidance control module 308 determines whether the occupant identifying data from a particular vehicle matches an individual in a personal database of the user. If so, control advances to block 412 where the example v2v guidance control module adds the matched individual to a potential leader list. Thereafter, control advances to block 414 where the example v2v guidance control module determines whether there is occupant identifying data from another vehicle. If so, control returns to block 410. If the occupant identifying data does not match an individual (block 410), control advances directly to block 414 to determine whether there is more occupant identifying data to analyze. If there is no additional occupant identifying data, control advances to block 416 where the example user interface 310 provides the potential leader list of individuals to the user for selection.

Adding matching individuals to the potential leader list in the manner described above reduces the total number of vehicles within communication distance of the follower vehicle 104 to only those vehicles associated with people the user in the follower vehicle 104 is likely to know. Furthermore, by including the name or other contact information of the matching individual in the list, the user is enabled to easily identify the corresponding vehicle the user desires to follow. Thus, once the potential leader list is provided (block 416), control advances to block 426 where the example user interface 310 receives a selection of the leader vehicle 102 from the potential leader list. In some examples, as mentioned above, the selection of the leader vehicle 102 is made indirectly by the user based on a selection of the matching individual associated with the leader vehicle 102.

Returning to block 404, if the example v2v guidance control module 308 determines not to identify the leader vehicle 102 based on occupant identifying data, control advances to block 418 where the example v2v communication interface 302 receives generic v2v information from nearby vehicles. Generic v2v information corresponds to the standard v2v information transmitted as part of standard BSM communications. Thus, in some examples, there is no need for the v2v communication interface 302 to specifically poll the nearby vehicles to request such information because each vehicle in the surrounding area equipped to communicate such information may do so automatically. At block 420, the example v2v information analyzer 306 identifies the nearby vehicles based on the generic v2v information. At block 422, the example v2v guidance control module 308 generates a potential leader list of generic vehicle identifiers based on a location of the nearby vehicles. In some examples, only a subset of all vehicles identified at block 420 are included in the potential leader list based on the assumption that the leader vehicle 102 is likely to be close to the follower vehicle 104 at the time that the user enters the user command for the follower vehicle 104 to enter the following mode. Reducing the potential leader list to correspond to vehicles within a threshold distance of (and/or in a particular position relative to) the follower vehicle 104 can assist the user in identifying the correct vehicle to request to become the leader vehicle 102. At block 424, the example user interface 310 provides the potential leader list of generic vehicle identifiers to the user for selection. Control then advances to block 426 where the example user interface 310 receives a selection of the leader vehicle 102 from the potential leader list.

At block 428, the example v2v communication interface 304 transmits a request to the vehicle associated with the selection to become the leader vehicle 102. As with all communications using DSRC, the transmission directed to the leader vehicle 102 is a broadcast that may be received by all nearby vehicles within the range of the transmission signal. However, the transmission may include a designation of the leader vehicle 102 as the intended recipient such that all other vehicles will ignore the transmission. At block 430, the example v2v communication interface 304 receives a response in the v2v information sent from the leader vehicle 102. In some examples, the response may include a request for additional information to which the follower vehicle may respond before a final determination on the request is provided.

At block 432, the example v2v guidance control module 308 determines whether authorization to follow the leader vehicle 102 is granted. If not, the example method of FIG. 4 ends because no further action can be taken by the follower vehicle 104 to follow the leader vehicle 102. However, if authorization is granted, control advances to block 434 where the example user interface 310 provides guidance information to the user based on leader information (e.g., the source information 216 of FIG. 2) included in the v2v information. At block 436, the v2v guidance control module 308 determines whether to continue following the leader vehicle 102. In some examples, the follower vehicle 104 continues following the leader vehicle 102, until either vehicle terminates the relationship. If the follower vehicle 104 is to continue following the leader vehicle 102, control advances to block 438 where the example v2v communication interface 302 receives additional leader information. Thereafter, control returns to block 434. If the example v2v guidance control module 308 determines not to continue following the leader vehicle 102 (block 436), the example method of FIG. 4 ends.

Figure 5:
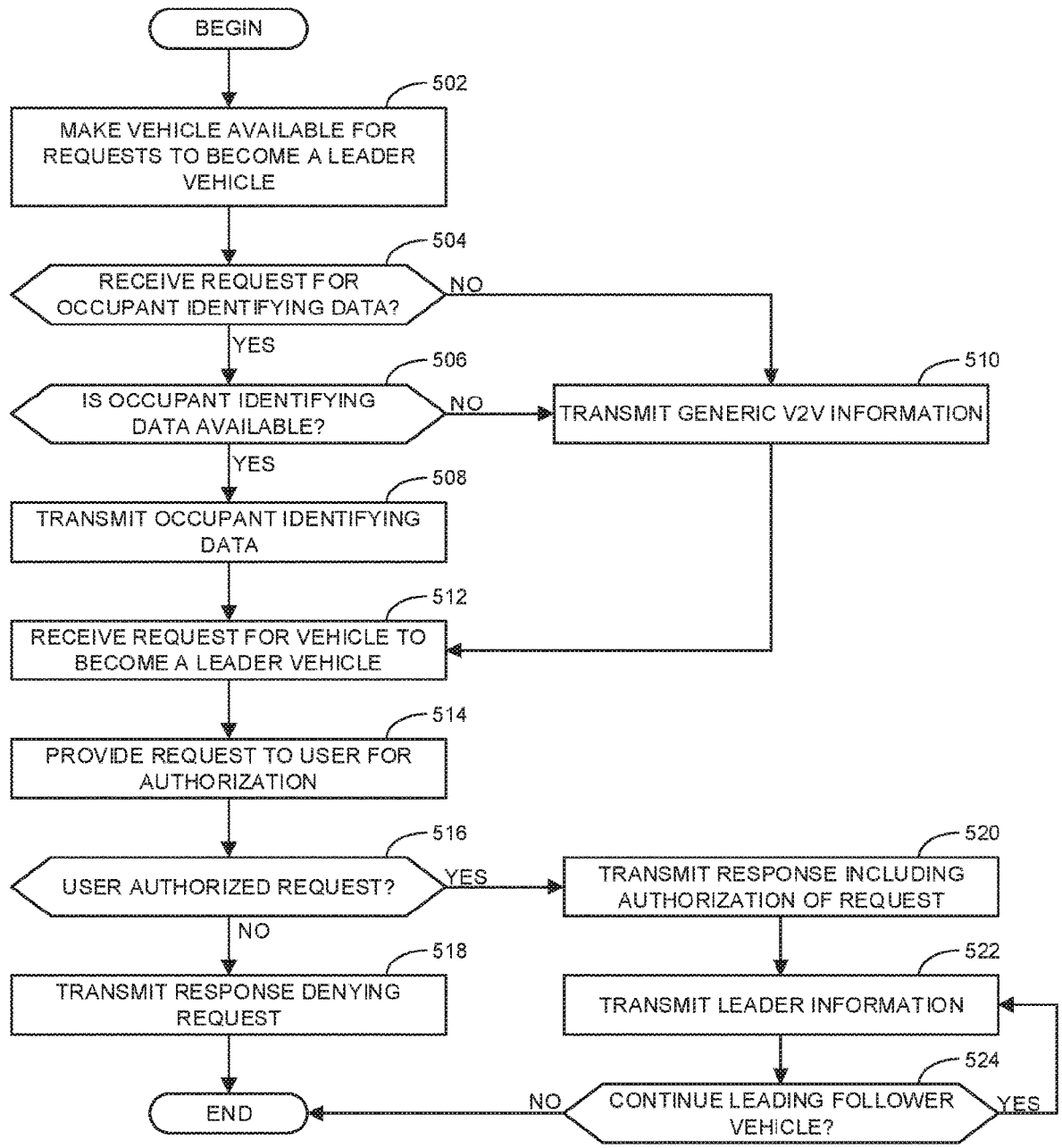
FIG. 5 is a flowchart representative of an example method to implement the example v2v guidance system of FIG. 3 in the leader vehicle of FIG. 1 to authorize one of the follower vehicles of FIG. 1 to begin following the leader vehicle.

FIG. 5 is a flowchart representative of an example method to implement the example v2v guidance system 300 in a leader vehicle (e.g., the leader vehicle 102 of FIG. 1) to authorize a follower vehicle (e.g., the follower vehicle 104) to begin following the leader vehicle 102. The method of FIG. 5 begins at block 502 where the example v2v guidance control module 308 makes the vehicle available for requests to become a leader vehicle. That is, in some examples, the leader vehicle 102 is set to be available to receive the request transmitted by the follower vehicle 104 at block 428 of FIG. 4. In some examples, the leader vehicle 102 is automatically configured to receive such requests such that block 502 may be omitted. In other examples, a user in the leader vehicle 102 (e.g., the driver or another occupant) may provide a user command to enter a leader mode to become available. In some examples, this approach may further facilitate the user in the follower vehicle 104 in identifying the leader vehicle by polling nearby vehicles to identify those that are available to receive requests to become a leader vehicle (e.g., in a leader mode).

At block 504, the example v2v communication interface 302 determines whether a request for occupant identifying data was received. Such a request corresponds to the follower vehicle 104 polling nearby vehicles in block 406 of FIG. 4. If a request for occupant identifying data was received, control advances to block 506 where the example v2v guidance control module 308 determines whether occupant identifying data is available. Occupant identifying data may be available if a smartphone is connected to the vehicle and/or if the vehicle is connected to a social media account. If occupant identifying data is available, control advances to block 508 where the example v2v communication interface 302 transmits the occupant identifying data before advancing to block 512. Returning to block 506, if no occupant identifying data is available, the request for such data is ignored and control advances to block 510 where the example v2v communication interface transmits generic v2v information. Likewise, if no request for occupant identifying data was received (block 504), control advances directly to block 510 to transmit the generic v2v information before advancing to block 512.

At block 512, the example v2v communication interface 302 receives a request for the vehicle to become a leader vehicle. Such a request corresponds to the request transmitted by the follower vehicle 104 at 428 of FIG. 4. At block 514, the example user interface 310 provides the request to a user for authorization. The user may be the driver of the leader vehicle 102 or a different occupant of the leader vehicle 102. At block 516, the example v2v guidance control module 308 determines whether the user authorized the request. In some examples, as mentioned above, the user may request additional information that may be communicated to the follower vehicle 104 for additional feedback before authorization is granted or denied. If the example v2v guidance control module 308 determines the user did not authorize the request, control advances to block 518 where the example v2v communication interface transmits a response denying the request, whereupon the example method of FIG. 5 ends.

If the example v2v guidance control module 308 determines the user did authorize the request (block 516), control advances to block 520 where the example v2v communication interface 302 transmits a response including authorization of the request. At block 522, the example v2v communication interface transmits leader information. In some examples, the response including the authorization and the leader information are included in a single transmission. In other examples, the response and the leader information are included in separate transmissions. At block 524, the example v2v guidance control module 308 determines whether to continue leading the follower vehicle 104. If so, control returns to block 522. Otherwise, the example method of FIG. 5 ends.

Figure 6:
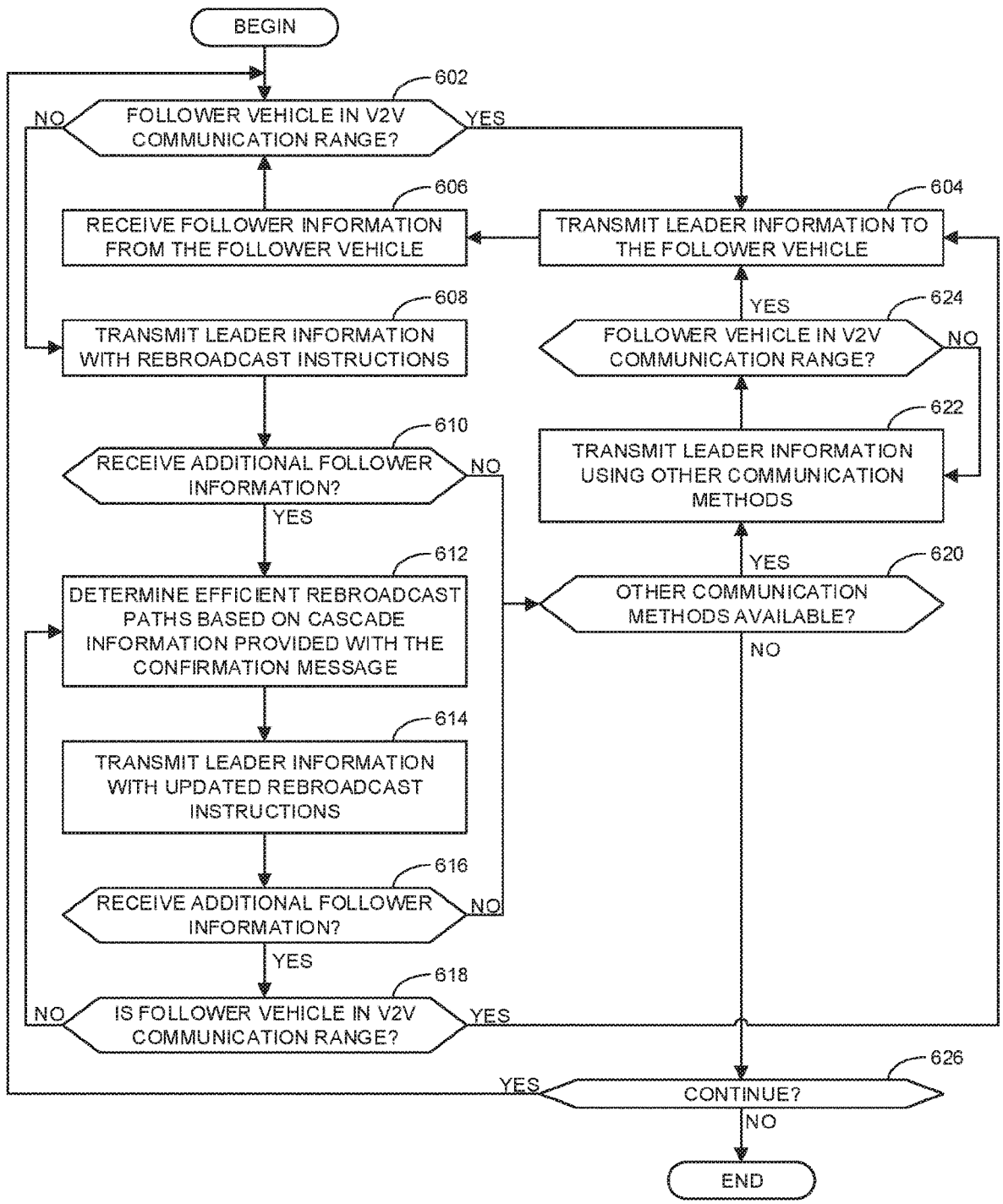
FIG. 6 is a flowchart representative of an example method to implement the example v2v guidance system of FIG. 3 in the leader vehicle 102 of FIG. 1 to provide leader information to one of the follower vehicles of FIG. 1.

FIG. 6 is a flowchart representative of an example method to implement the example v2v guidance system 300 in a leader vehicle (e.g., the leader vehicle 102 of FIG. 1) to provide leader information to a follower vehicle (e.g., the follower vehicle 108). The method of FIG. 6 begins at block 602 where the example v2v information analyzer 306 determines whether the follower vehicle 108 is in v2v communication range. This may be determined based on the leader vehicle 102 receiving v2v information directly from the follower vehicle 108. If the follower vehicle 108 is in range, control advances to block 604 where the example v2v communication interface 302 transmits leader information to the follower vehicle 108. At block 606, the example v2v communication interface 302 receives follower information from the follower vehicle 108. In the illustrated example, both the leader information and the follower information are transmitted between the leader vehicle 102 and the follower vehicle 108 using DSRC (e.g., via BSM communications). In some examples, if the distance between the leader vehicle 102 and the follower vehicle 108 is approaching the communication range for BSM communications, the follower information from the follower vehicle 108 may indicate that direct communications may be lost. Control then returns to block 602 to again determine whether the follower vehicle is in communication range. If not, control advances to block 608.

At block 608, the example v2v communication interface 302 transmits leader information with rebroadcast instructions. In some examples, the rebroadcast instructions may direct intermediate relay nodes (e.g., other nearby vehicles) to bridge the gap between the leader vehicle 102 and the follower vehicle 108. In some examples, the same intermediate relay nodes (or different ones) may provide a return path for follower information sent from the follower vehicle 108, which, if received, indicates that the initial message (sent at block 608) was successfully cascaded to the follower vehicle 108. Thus, at block 610, the example v2v guidance control module 308 determines whether additional follower information was received. If so, control advances to block 612, where the example v2v guidance control module 308 determines efficient rebroadcast paths based on cascade information provided with the follower information. At block 614, the example v2v communication interface 302 transmits leader information with updated rebroadcast instructions. In some examples, the updates to the rebroadcast instructions are based on the identification of the efficient rebroadcast paths. Additionally, the updates to the rebroadcast instructions may include an updated last known location of the follower vehicle 108 as reported from the follower information received at block 610.

At block 616, the example v2v guidance control module 308 determines whether additional follower information was received (e.g., to confirm delivery of the transmission sent at block 614 and to provide updated location data). If so, control advances to block 618, where the example v2v information analyzer 306 determines whether the follower vehicle 108 is in v2v communication range. If not, control returns to block 612 to continue determining efficient rebroadcast paths and updating the rebroadcast instructions to cascade leader information via intermediate relay nodes. If the example v2v information analyzer 306 determines that the follower vehicle 108 is in v2v communication range, control returns to block 604.

The absence of the additional follower information being received at blocks 610 and 616 indicates that cascading a message through intermediate relay nodes has failed. Accordingly, if no follower information is received at either block 610 or block 616, control advance to block 620 where the example v2v guidance control module 308 determines whether other communication methods are available. If so, control advances to block 622 where the example alternate communication interface 304 transmits the leader information using the other communication methods. Thereafter, at block 624, the example v2v information analyzer 306 determines whether the follower vehicle 108 is in v2v communication range. If not, control returns to block 622. Otherwise, control returns to block 604.

Returning to block 620, if the example v2v guidance control module 308 determines that no other communication methods are available, control advances to block 626 where the example v2v guidance control module 308 determines whether to continue. If so control returns to block 602. Otherwise, the example method of FIG. 6 ends.

Figure 7:
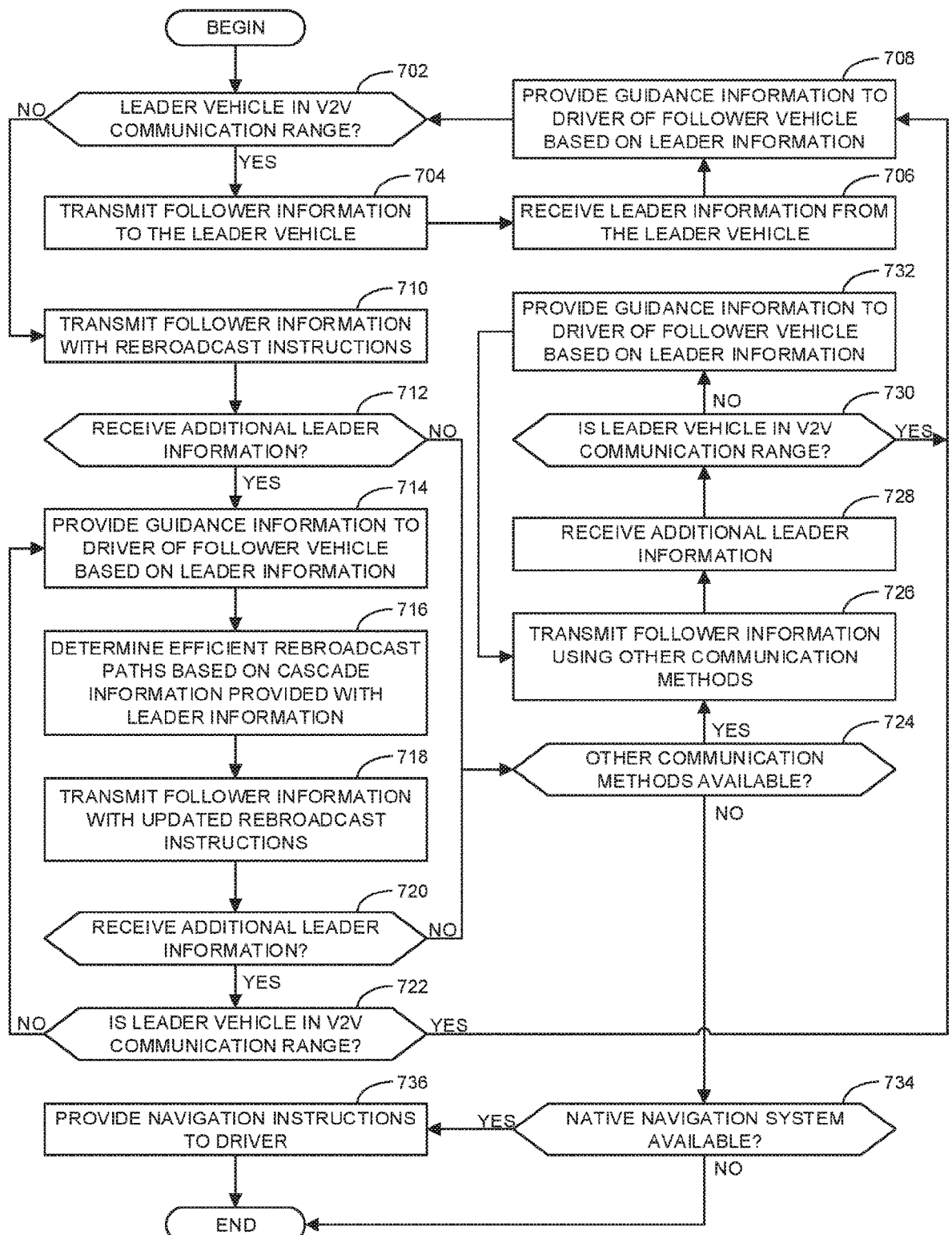
FIG. 7 is a flowchart representative of an example method to implement the example v2v guidance system of FIG. 3 in one of the follower vehicles of FIG. 1 to track and follow the leader vehicle of FIG. 1.

FIG. 7 is a flowchart representative of an example method to implement the example v2v guidance system 300 in a follower vehicle (e.g., the follower vehicle 108 of FIG. 1) to track and follow a leader vehicle (e.g., the leader vehicle 102). The method of FIG. 7 begins at block 702 where the example v2v information analyzer 306 determines whether the leader vehicle 102 is in v2v communication range. If so, control advances to block 704 where the example v2v communication interface 302 transmits follower information to the leader vehicle 102. At block 706, the example v2v communication interface 302 receives leader information from the leader vehicle 102. At block 708, the example user interface 310 provides guidance information to a driver of the follower vehicle based on the leader information. Control then returns to block 702 to again determine whether the follower vehicle is in communication range. If the example v2v information analyzer 306 determines that the leader vehicle 102 is not in v2v communication range, control advances to block 710.

At block 710, the example v2v communication interface 302 transmits follower information with rebroadcast instructions. At block 712, the example v2v guidance control module 308 determines whether additional leader information was received. If so, control advances to block 714, where the example user interface 310 provides guidance information to the driver of the follower vehicle based on the leader information. At block 716, the example v2v guidance control module 308 determines efficient rebroadcast paths based on cascade information provided with the leader information. At block 718, the example v2v communication interface 302 transmits follower information with updated rebroadcast instructions.

At block 720, the example v2v guidance control module 308 determines whether additional leader information was received. If so, control advances to block 722, where the example v2v information analyzer 306 determines whether the leader vehicle 102 is in v2v communication range. If not, control returns to block 714 to provide guidance information from the additional leader information and to continue determining efficient rebroadcast paths and updating the rebroadcast instructions to cascade additional follower information via intermediate relay nodes. If the example v2v information analyzer 306 determines that the leader vehicle 102 is in v2v communication range, control returns to block 708.

The absence of additional leader information at blocks 712 and 720 indicates that cascading a message through intermediate relay nodes has failed. Accordingly, if no additional leader information is received at either block 712 or block 720, control advance to block 724 where the example v2v guidance control module 308 determines whether other communication methods are available. If so, control advances to block 726 where the example alternate communication interface 304 transmits follower information using the other communication methods. At block 728, the example alternate communication interface 304 receives additional leader information. At block 730, the example v2v information analyzer 306 determines whether the leader vehicle 102 is in v2v communication range. If not, control advances to block 732 where the example user interface 310 provides guidance information to the driver of the follower vehicle 108 based on the leader information. Thereafter, control returns to block 726. If the example v2v information analyzer 306 determines that the leader vehicle 102 is in v2v communication range (block 730), control returns to block 708.

Returning to block 724, if the example v2v guidance control module 308 determines that no other communication methods are available, control advances to block 734 where the example v2v guidance control module 308 determines whether there is a native navigation system available (e.g., the navigation system 312). If so, control advances to block 736 where the example user interface 310 provides navigation instructions to the driver before the method of FIG. 7 ends. If the example v2v guidance control module 308 determines there is not a native navigation system available (block 734), the example method of FIG. 7 ends.

Figure 8:
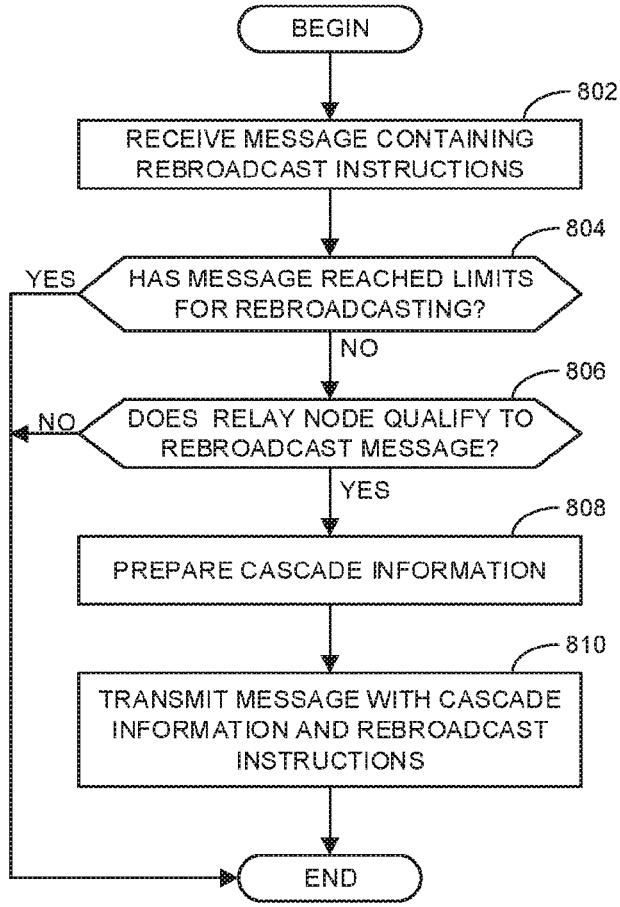
FIG. 8 is a flowchart representative of an example method to implement the example v2v guidance system of FIG. 3 in a vehicle functioning as an intermediate relay node between the leader vehicle and one of the follower vehicles of FIG. 1.

FIG. 8 is a flowchart representative of an example method to implement the example v2v guidance system 300 in a vehicle functioning as an intermediate relay node. As mentioned above, in some examples, vehicles may serve as intermediate relay nodes without implementing the v2v guidance system 300 so long as the vehicles otherwise include the capability to send and receive broadcasts between vehicles using DSRC. Thus, the method of FIG. 8 may be used to implement communication systems other than the v2v guidance system 300. However, for the sake of convenience, FIG. 8 is described with reference to the v2v guidance system 300 of FIG. 3.

The method of FIG. 8 begins at block 802 where the example v2v communication interface 302 receives a message containing rebroadcast instructions. In some examples, the message may be from the leader vehicle 102 and include leader information. In other examples, the message may be from the follower vehicle 108 and include follower information. In other examples, the message may be a relay message from another intermediate relay node and include cascade information along with the source information (e.g., the leader information or the follower information).

At block 804, the example v2v information analyzer 306 determines whether the message has reached limits for rebroadcasting. In some examples, the limits are specified within the rebroadcast instructions. The limits may define a threshold number of transmissions for a rebroadcast path and/or a threshold period of time from the initial message within which the message may be rebroadcast. If the example v2v information analyzer 306 determines that the message has reached the specified limits for rebroadcasting, the example method of FIG. 8 ends. Otherwise, control advances to block 806, where the example v2v information analyzer 306 determines whether the relay node qualifies to rebroadcast the message. In some examples, the qualifications for the relay node are specified in the rebroadcast instructions. In some examples, a relay node (e.g., a nearby vehicle) is qualified to rebroadcast a message if the node is specifically designated as such within the rebroadcast instructions associated with the message. In some examples, a relay node is qualified based on a location and/or direction of travel of the node relative to the leader vehicle 102 and the follower vehicle 108. If the example v2v information analyzer 306 determines that the relay node does not qualify to rebroadcast the message, the example method of FIG. 8 ends. Otherwise, control advances to block 808.

At block 808, the example v2v guidance control module 308 prepares cascade information. In some examples, the cascade information includes identifying information relating to the relay node as well as any previously relay nodes in the rebroadcast path. At block 810, the example v2v communication interface 302 transmits the message with the cascade information and the rebroadcast information. Thereafter, the example method of FIG. 8 ends.

Figure 9:
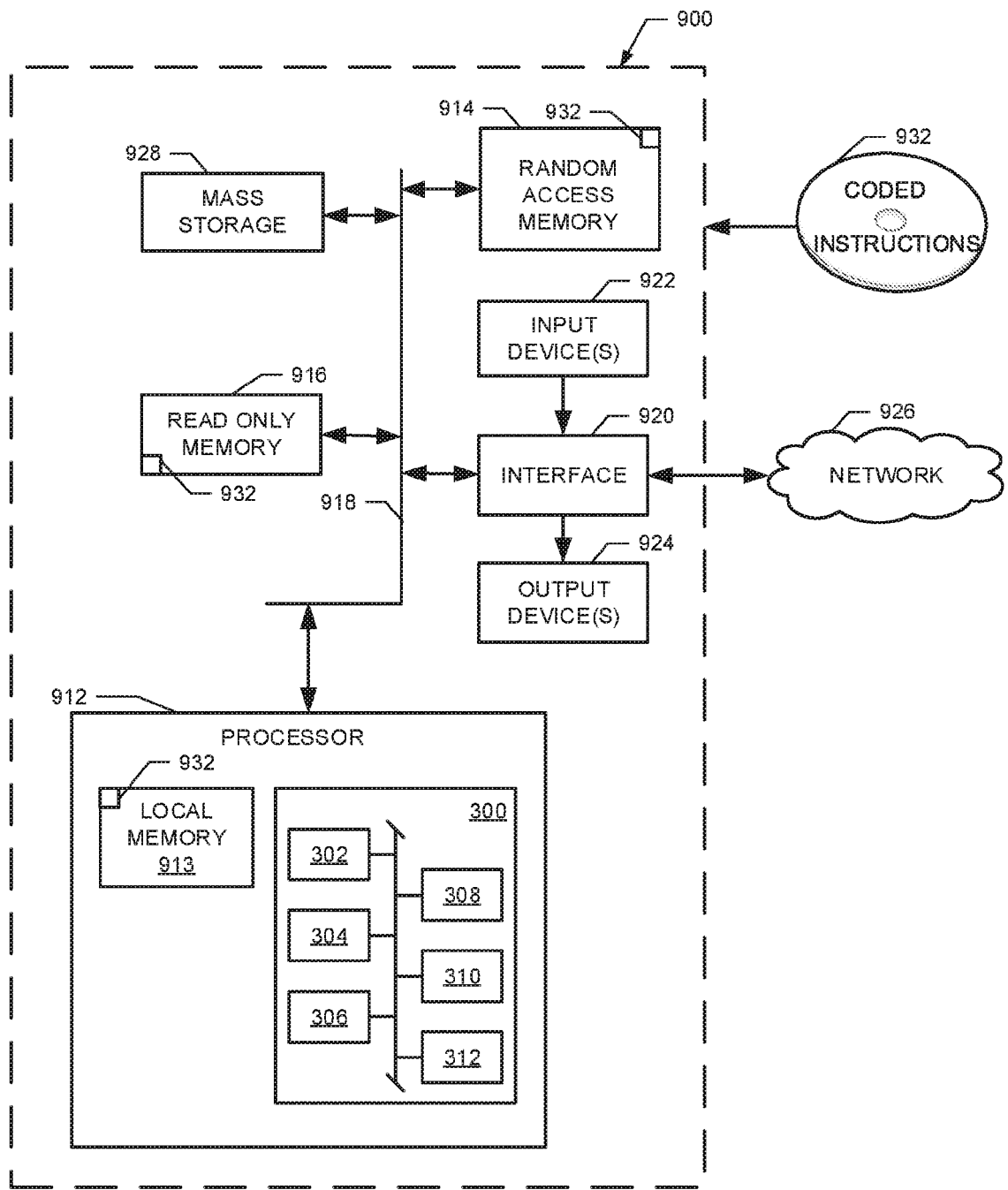
FIG. 9 is a block diagram of an example processor system structured to execute example machine readable instructions represented at least in part by FIGS. 4-8 to implement the example v2v guidance system of FIG. 3.

FIG. 9 is a block diagram of an example processor platform 900 capable of executing instructions to implement the methods of FIGS. 4-8 and the v2v guidance system 300 of FIG. 3. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The processor 912 of FIG. 9 may implement one or more of the example v2v communication interface 302, the example alternate communication interface 304, the example v2v information analyzer 306, the example v2v guidance control module 308, the example user interface 310, the example navigation system 312, and/or, more generally, the example v2v guidance system 300 of FIG. 3.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the methods of FIGS. 4-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture assist a driver of a follower vehicle in following a leader vehicle. More particularly, examples disclosed herein enable the relay of information regarding the location and heading of a leader vehicle to a follower vehicle to provide guidance to the driver of the follower vehicle even if the follower vehicle becomes separated from the leader vehicle. In some examples, this is made possible through the use BSM communications using DSRC between vehicles. While BSM communications have an upper range of approximately 300 meters, examples disclosed herein enable longer range communications by cascading or repeating v2v information between the leader vehicle and the follower vehicle via one or more intermediate relay nodes such as other nearby vehicles.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicle-to-vehicle guidance system in a first vehicle, the vehicle-to-vehicle guidance system comprising;
a communication interface, executed via a processor, to:
transmit a first message to a second vehicle, the first message requesting the second vehicle to become a leader vehicle for the first vehicle to follow;
receive a second message from the second vehicle, the second message including leader information indicative of a travel path of the second vehicle;
receive authorization from the second vehicle for the first vehicle to follow the second vehicle; and
transmit a third message to an intermediate relay node between the first vehicle and the second vehicle when the first vehicle is unable to directly communicate with the second vehicle, the third message including follower information and rebroadcast instructions, the rebroadcast instructions to instruct the intermediate relay node to rebroadcast the third message; and
a user interface, executed via the processor, to provide guidance information to a driver of the first vehicle based on the leader information.

2. The vehicle-to-vehicle guidance system of claim 1, wherein the first and second messages are basic safety messages associated with dedicated short-range communications.

3. The vehicle-to-vehicle guidance system of claim 1, further including a control module to generate a potential leader list identifying vehicles nearby the first vehicle, the nearby vehicles including the second vehicle, the second vehicle to be designated as an intended recipient of the first message based on a user-selection of the second vehicle from the potential leader list.

4. The vehicle-to-vehicle guidance system of claim 1, wherein the rebroadcast instructions include a limit on rebroadcasts of the third message, the limit corresponding to at least one of a threshold number of rebroadcasts or a timeout period for delivery of the third message to the second vehicle.

5. The vehicle-to-vehicle guidance system of claim 1, wherein the rebroadcast instructions include a qualification for the intermediate relay node to rebroadcast the follower information, the qualification based on at least one of a list of designated relay nodes or a location of the intermediate relay node relative to at least one the first vehicle or the second vehicle.

6. The vehicle-to-vehicle guidance system of claim 1, furthering including a control module to determine an efficient rebroadcast path based on cascade information received in multiple instances of a fourth message from the second vehicle associated with different rebroadcast paths through different intermediate relay nodes, the cascade information identifying ones of the different intermediate relay nodes in each of the different rebroadcast paths corresponding to each instance of the fourth message, the control module to designate at least one of the different intermediate relay nodes associated with the efficient rebroadcast path for a return communication path.

7. A vehicle-to-vehicle guidance system in a first vehicle, the vehicle-to-vehicle guidance system comprising;
a control module to generate a potential leader list identifying vehicles nearby the first vehicle, the nearby vehicles including a second vehicle;
a communication interface, executed via a processor, to:
transmit a first message to the second vehicle, the first message requesting the second vehicle to become a leader vehicle for the first vehicle to follow, the second vehicle to be designated as an intended recipient of the first message based on a user-selection of the second vehicle from the potential leader list, wherein the potential leader list is to identify the nearby vehicles with generic vehicle identifiers corresponding to vehicle-to-vehicle information obtained from the nearby vehicles;

receive a second message from the second vehicle, the second message including leader information indicative of a travel path of the second vehicle; and receive authorization from the second vehicle for the first vehicle to follow the second vehicle; and a user interface, executed via the processor, to provide guidance information to a driver of the first vehicle based on the leader information.

8. The vehicle-to-vehicle guidance system of claim 7, further including a vehicle-to-vehicle information analyzer to identify a subset of the nearby vehicles based on a location of the subset of the nearby vehicles defined in the vehicle-to-vehicle information, the potential leader list including the generic vehicle identifiers for the subset of the nearby vehicles and excluding other ones of the nearby vehicles.

9. A vehicle-to-vehicle guidance system in a first vehicle, the vehicle-to-vehicle guidance system comprising;

a communication interface, executed via a processor, to:
poll nearby vehicles for available vehicle occupant identifying data, the nearby vehicles including a second vehicle;
transmit a first message to the second vehicle, the first message requesting the second vehicle to become a leader vehicle for the first vehicle to follow;
receive a second message from the second vehicle, the second message including leader information indicative of a travel path of the second vehicle; and
receive authorization from the second vehicle for the first vehicle to follow the second vehicle;

a control module to:
compare the vehicle occupant identifying data to individuals in a personal database of a person in the first vehicle; and
generate a potential leader list identifying ones of the nearby vehicles associated with the vehicle occupant identifying data that matches the individuals in the personal database of a driver of the first vehicle, the second vehicle to be designated as an intended recipient of the first message based on a user-selection of the second vehicle from the potential leader list; and a user interface, executed via the processor, to provide guidance information to the driver based on the leader information.

10. The vehicle-to-vehicle guidance system of claim 9, wherein the occupant identifying data corresponds to phone numbers associated with occupants in the nearby vehicles and the personal database corresponds to a phone contact list of the person in the first vehicle.

11. The vehicle-to-vehicle guidance system of claim 9, wherein the occupant identifying data corresponds to social media profiles associated with occupants in the nearby vehicles and the personal database corresponds to a list of social media connections of the person in the first vehicle.

12. A method comprising
transmitting, from a first vehicle, a first message to a second vehicle, the first message requesting the second vehicle to become a leader vehicle;
receiving a second message from the second vehicle, the second message including leader information indicative of a travel path of the second vehicle;
receiving authorization from the second vehicle for the first vehicle to follow the second vehicle; and
transmitting, from the first vehicle, a third message to an intermediate relay node between the first vehicle and the second vehicle when the first vehicle is unable to directly communicate with the second vehicle, the third message including follower information and rebroadcast instructions, the rebroadcast instructions to instruct the intermediate relay node to rebroadcast the third message.

13. The method of claim 12, wherein the first and second messages are basic safety messages associated with dedicated short-range communications.

14. The method of claim 12, wherein the rebroadcast instructions include a limit on rebroadcasts of the third message, the limit corresponding to at least one of a threshold number of rebroadcasts or a timeout period for delivery of the third message to the second vehicle.

15. The method of claim 12, wherein the rebroadcast instructions include a qualification for the intermediate relay node to rebroadcast the follower information, the qualification based on at least one of a list of designated relay nodes or a location of the intermediate relay node relative to at least one the first vehicle or the second vehicle.

16. The method of claim 12, furthering including:
receiving, at the first vehicle, multiple instances of a fourth message from the second vehicle via different rebroadcast paths through different intermediate relay nodes, the instances of the fourth message including cascade information identifying ones of the different intermediate relay nodes in the corresponding rebroadcast path of each instance of the fourth message;
determining an efficient rebroadcast path based on the cascade information in the multiple instances of the fourth message; and
designating at least one of the different intermediate relay nodes associated with the efficient rebroadcast path for a return communication path.

17. A tangible computer readable storage medium comprising instructions that, when executed, cause a first vehicle to at least:
transmit a first message to a second vehicle, the first message requesting the second vehicle to become a leader vehicle for the first vehicle to follow;
receive a second message from the second vehicle, the second message including leader information indicative of a travel path of the second vehicle;
receive authorization from the second vehicle for the first vehicle to follow the second vehicle; and
transmitting, from the first vehicle, a third message to an intermediate relay node between the first vehicle and the second vehicle when the first vehicle is unable to directly communicate with the second vehicle, the third message including follower information and rebroadcast instructions, the rebroadcast instructions to instruct the intermediate relay node to rebroadcast the third message.

18. The tangible computer readable storage medium of claim 17, wherein the instructions further cause the first vehicle to generate a potential leader list identifying vehicles nearby the first vehicle, the potential leader list to identify the nearby vehicles with generic vehicle identifiers corresponding to vehicle-to-vehicle information obtained from the nearby vehicles, the nearby vehicles including the second vehicle, the second vehicle to be designated as an intended recipient of the first message based on a user-selection of the second vehicle from the potential leader list.

19. The tangible computer readable storage medium of claim 17, wherein the instructions further cause the first vehicle to:
- poll vehicles nearby the first vehicle for available vehicle occupant identifying data, the nearby vehicles including the second vehicle;
- compare the vehicle occupant identifying data to individuals in a personal database of a person in the first vehicle; and
- generate a potential leader list identifying ones of the nearby vehicles associated with the vehicle occupant identifying data that matches the individuals in the personal database of a driver of the first vehicle, the second vehicle to be designated as an intended recipient of the first message based on a user-selection of the second vehicle from the potential leader list.

20. The method of claim 12, further including generating a potential leader list identifying vehicles nearby the first vehicle, the potential leader list to identify the nearby vehicles with generic vehicle identifiers corresponding to vehicle-to-vehicle information obtained from the nearby vehicles, the nearby vehicles including the second vehicle, the second vehicle to be designated as an intended recipient of the first message based on a user-selection of the second vehicle from the potential leader list.

* * * * *